United States Patent [19]

Braeuner

[11] Patent Number: 4,586,463
[45] Date of Patent: May 6, 1986

[54] BIRD CAGE

[75] Inventor: Horst Braeuner, Hanover Park, Ill.

[73] Assignee: The Original Vogelbauer Corporation, Hanover Park, Ill.

[21] Appl. No.: 636,813

[22] Filed: Aug. 1, 1984

[51] Int. Cl.⁴ ............................................. A01K 31/06
[52] U.S. Cl. ................................................... 119/17
[58] Field of Search ................................ 119/17, 18, 1

[56] References Cited

U.S. PATENT DOCUMENTS

| | | | |
|---|---|---|---|
| 1,255,834 | 2/1918 | Quinn | 119/17 |
| 1,347,397 | 7/1920 | Newman | 119/17 |
| 1,468,730 | 9/1923 | Oster . | |
| 1,771,492 | 7/1930 | Karlson | 119/17 |
| 1,896,097 | 2/1933 | Palmer | 119/17 |
| 1,963,414 | 6/1934 | Little | 119/17 |
| 2,129,786 | 9/1938 | Sacre | 119/17 |
| 2,983,251 | 5/1961 | Lingis | 119/17 |
| 3,100,474 | 8/1963 | Schneider | 119/17 |
| 3,662,712 | 5/1972 | Singer | 119/17 |
| 3,698,360 | 10/1972 | Rubricius | 119/17 |
| 3,771,495 | 11/1973 | Stevenson et al. | 119/17 |
| 3,815,549 | 6/1974 | Opmeer | 119/17 |

Primary Examiner—Robert P. Swiatek
Attorney, Agent, or Firm—Allegretti, Newitt, Witcoff & McAndrews, Ltd.

[57] ABSTRACT

A bird cage having a lower double drawer assembly movable between four positions is disclosed. The double drawer assembly allows the lower assembly to be completely cleaned of debris without the need to confine or capture the bird. Additionally, protective coating of the interior of a wooden bird cage is disclosed.

13 Claims, 12 Drawing Figures

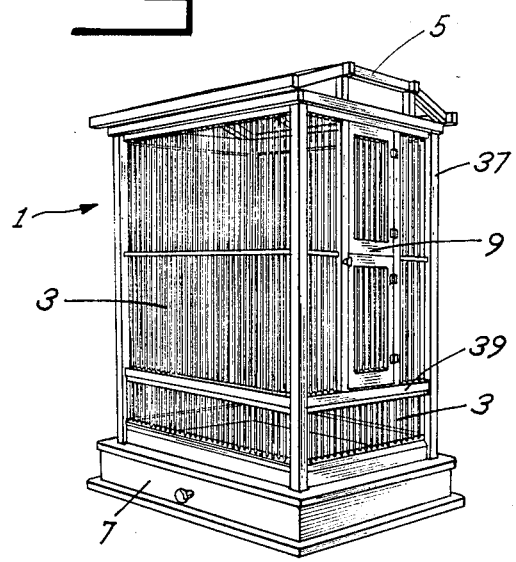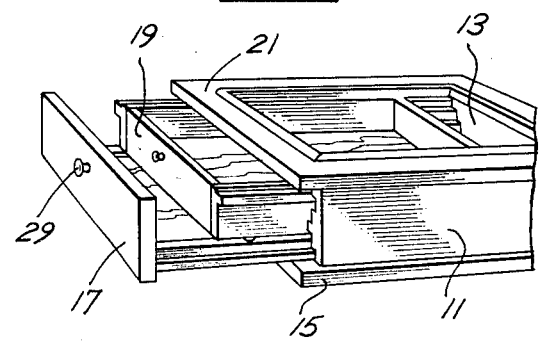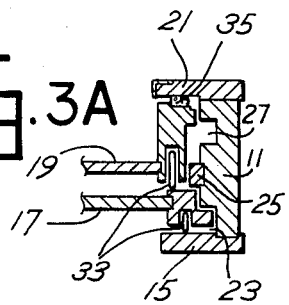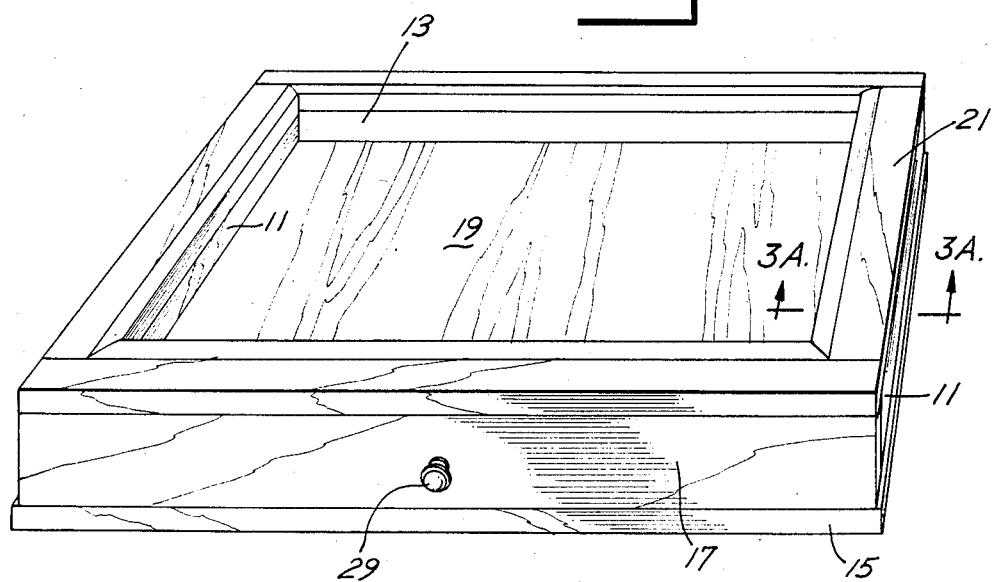

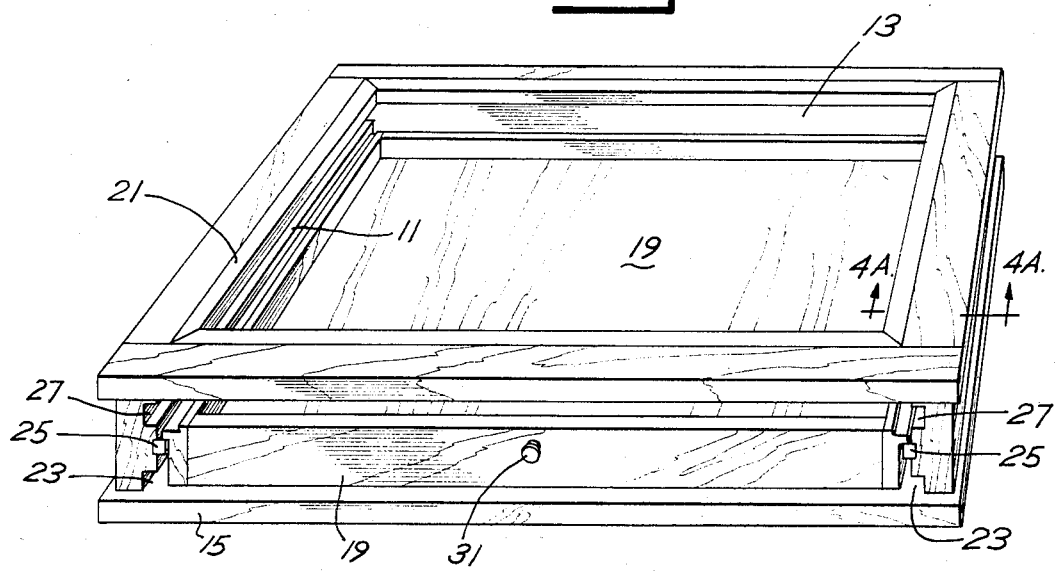
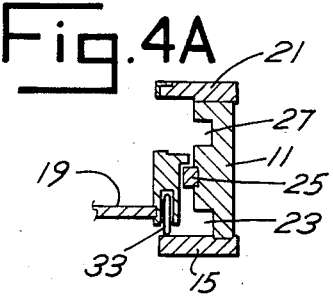 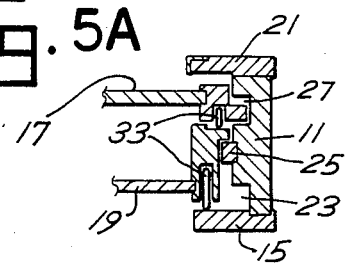
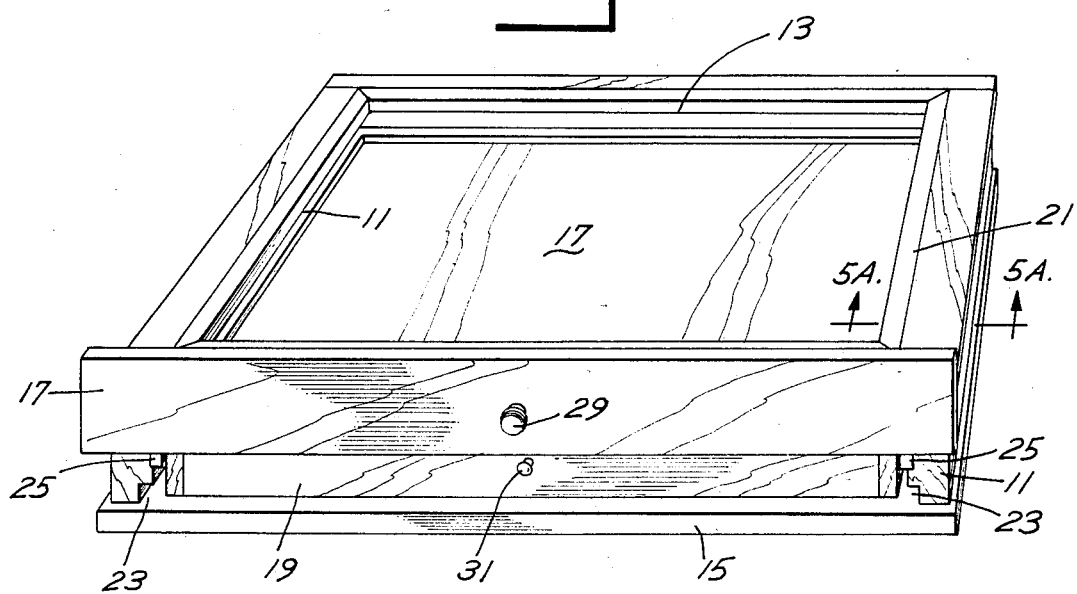

BIRD CAGE

BACKGROUND OF THE INVENTION

1. Field of the Invention

The present invention relates to bird cages.

2. Description of the Prior Art

Many designs of cages are shown in the prior art for housing pet birds. One problem that is common to many of these designs is that it is difficult to clean the bottom of the cage where debris inevitably collects. Some bird cages are designed such that the bird must be captured and removed from the cage before the interior of the cage can be cleaned. This is obviously a cumbersome process and can result in injury to the bird or escape. An example of this type of cage is shown in U.S. Pat. No. 1,963,414 (Little), which discloses a removable bottom 10 positioned above the main bottom 2 of the bird cage. The removable bottom 10 can be removed for cleaning while the main bottom 2 confines the birds and collects debris. However, since the main bottom 2 is not itself removable, it is difficult to clean without capture of the bird.

Other known bird cage designs require that the entire cage be lifted in order to clean the debris from the bottom. An example of such a bird cage is disclosed in U.S. Pat. No. 3,815,549 (Opmeer). Opmeer discloses a bird cage having a bottom and an upper portion connected by a coupling section. The coupling section contains a separator 28 that confines the birds in the upper portion of the cage and collects debris while the bottom section is removed from the cage for cleaning. However, to remove the bottom section, it is necessary to lift the entire cage. Thus, there is a need for a bird cage that can be completely and thoroughly cleaned without removal of the bird or lifting of the cage.

U.S. Pat. Nos. 2,129,786 (Sacre) and 2,983,251 (Lingis) both disclose the use of replaceable paper sheets on the bottom of bird cages for debris collection. U.S. Pat. No. 3,100,474 (Schneider) discloses a commode for pets that has a removable plate member that collects debris positioned above two removable drawers. The upper drawer contains a screen that strains the debris to filter the recyclable litter into the lower drawer for subsequent use.

Another problem with respect to the construction of bird cages is that many species of birds chew wood. One of the most popular household birds, the parakeet, can easily chew through wood. Though wooden bird cages are known in the prior art (see, e.g., U.S. Pat. No. 1,468,730 (Oster) and are desirable from a home decorating standpoint, they can only be used for limited numbers of bird species. Thus, there is a need for a bird cage that preserves the decorative beauty of wood construction, yet is suitable for species of birds that would normally destroy wooden bird cages.

SUMMARY OF THE INVENTION

It is an object of the present invention to provide a bird cage that can be completely and thoroughly cleaned without removal of the bird or lifting of the cage.

It is a specific object of the present invention to provide a bird cage that has an upper assembly for the confinement of the bird and a lower assembly for the collection of debris. The lower assembly includes a plurality of opposed side walls, a first drawer and a second drawer. The opposed side walls define a lower drawer position and an upper drawer position within the lower assembly and additionally include support means. The lower assembly as a whole is characterized by four positions: a collection position, a first intermediate position, a second intermediate position, and a cleaning position. In the collection position, the first drawer occupies the lower drawer position and the second drawer occupies the upper drawer position. In this position, the second drawer rests upon the first drawer and is positioned to collect debris. In the first intermediate position, the second drawer occupies the lower drawer position and the first drawer is removed entirely from the lower assembly. In the second intermediate position, the first drawer occupies the upper drawer position and the second drawer occupies the lower drawer position and, in the cleaning position, the first drawer occupies the upper position while the second drawer is completely removed from the lower assembly such that the second drawer can be cleaned of accumulated debris.

The lower assembly can be easily moved from the collection position to the first intermediate position to the second intermediate position to the cleaning position and back again. During this sequence of positions, one of the drawers is always positioned to collect debris. Furthermore, both the first drawer and the second drawer may be removed from the lower assembly such that they may both be completely cleaned while confining the bird in the upper cage assembly.

It is a further object of the present invention to provide a bird cage made of wood that is suitable for housing bird species that normally chew and destroy wooden bird cages.

It is a further specific object of the present invention to provide a bird cage having an interior and an exterior, at least a portion of the interior and at least a portion of the exterior being made of wood. The portion of the interior that is wood is then protectively coated with a substance, preferably vinyl, that resists or prevents birds from chewing through the bird cage. In a most preferred form, the exterior of the bird cage made of wood is uncoated so that the decorative beauty of the wood exterior is preserved.

Further objects and embodiments of the present invention will be made evident by the following description of the preferred embodiments and the claims.

BRIEF DESCRIPTION OF THE DRAWINGS OF THE PREFERRED EMBODIMENT

FIG. 1 is a side perspective view of the entire bird cage according to the present invention showing the upper cage assembly and the lower cage assembly;

FIG. 2 is a side perspective view of the lower assembly;

FIG. 3 is a front perspective view of the lower assembly in the collection position;

FIG. 3A is a front cross-sectional view of the lower assembly in the collection position;

FIG. 4 is a front perspective view of the lower assembly in the first intermediate position;

FIG. 4A is a front cross-sectional view of the lower assembly in the first intermediate position;

FIG. 5 is a front perspective view of the lower assembly in the second intermediate position;

FIG. 5A is a front cross-sectional view of the lower assembly in the second intermediate position;

DESCRIPTION OF THE PREFERRED EMBODIMENTS

Figure 6:
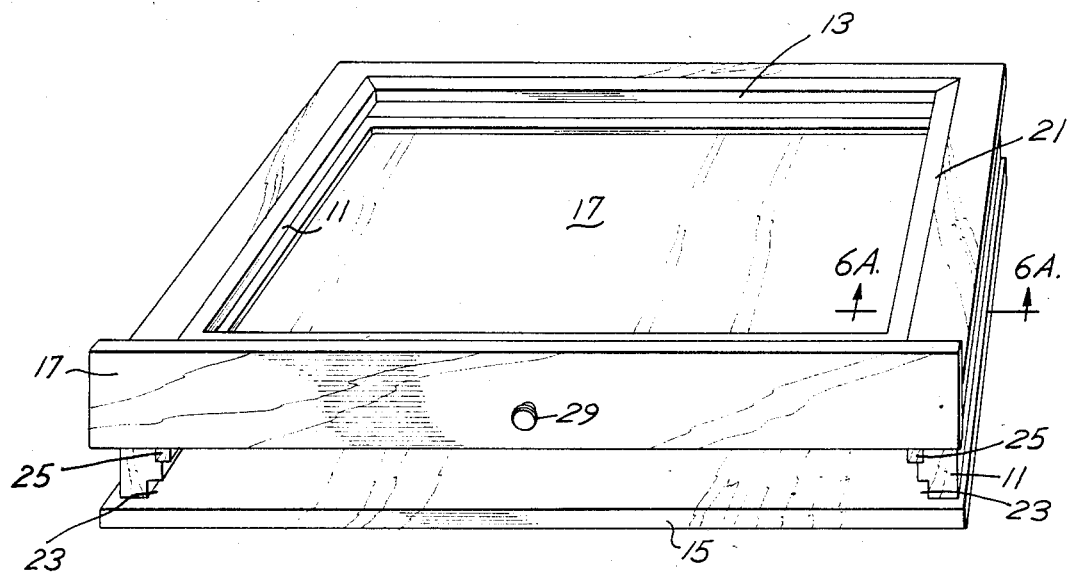
FIG. 6 is a front perspective view of the lower assembly in the cleaning position.

Referring to FIG. 1, the bird cage of the present invention includes an upper cage assembly 1 comprising side walls 3 and top 5. The upper cage assembly 1 serves as the primary confinement area for the bird or other small animal and includes a door 9 for insertion or removal of the bird or animal. The integrity of the confinement area is completed by the lower assembly 7, which is attached to and forms the bottom of the upper cage assembly 1. The entire bird cage may be attached to a support stand (not shown) so that the bird cage is free standing. However, other means for displaying the cage are also appropriate. The bird cage of this embodiment may be made of any suitable material.

Referring to FIGS. 2–6A, the lower assembly 7 of the present invention includes a pair of opposed side walls 11, a back wall 13 and a bottom 15. This arrangement of the lower assembly 7 defines an upper drawer position and a lower drawer position. Within the lower assembly 7, a first drawer 17 and a second drawer 19 are slidably disposed such that either of the drawers 17 and 19 can occupy the upper drawer position or the lower drawer position. In addition, one drawer can occupy one position while the other drawer occupies the other position. Thus, the lower assembly 7 is characterized by at least four separate positions: the first collection position, the first intermediate position; a second intermediate position; and the cleaning position.

Referring now to FIGS. 3 and 3A, the lower assembly 7 is normally left in the collection position. In this position, the first drawer 17 occupies the lower drawer position while the second drawer 19 occupies the upper drawer position. Thus, the second drawer 19 is positioned to collect the debris that falls from the upper cage assembly 1. As more particularly shown in FIG. 3A, the second drawer 19 rests upon the top of the first drawer 17. In the most preferred embodiment, the upper flange 21 restrains the upward movement of the second drawer 19, such that it remains in the proper collection position. In similar fashion, the first drawer 17 is restrained in its upward movement by lower slots 23.

Referring now to FIGS. 4 and 4A, the lower assembly 7 is also characterized by a first intermediate position. In this position, the second drawer 19 is located in the lower drawer position while the first drawer 17 is removed from the lower assembly 7. While the second drawer 19 occupies the lower drawer position in the first intermediate position, it may either rest on the bottom 15 of the lower assembly or on the opposed side rails 25. Although the second drawer 19 is now in the lower drawer position, it is still positioned to collect debris settling from the upper cage assembly 1.

Referring now to FIGS. 5 and 5A, the lower assembly is also characterized by a second intermediate position wherein the first drawer 17 occupies the upper drawer position and the second drawer 19 occupies the lower drawer position. In the second intermediate position, the second drawer 19 may rest either on the bottom 15 of the lower assembly 17 or on the opposed side rails 25. The first drawer 17 may rest on the second drawer 19 or on the upper slots 27. The upward movement of the first drawer 17 may be restrained by the upper slots 27, the upper flange 21 or both. In this position, the first drawer 17 is in position to collect the debris from the upper cage assembly 1.

Figure 6A:
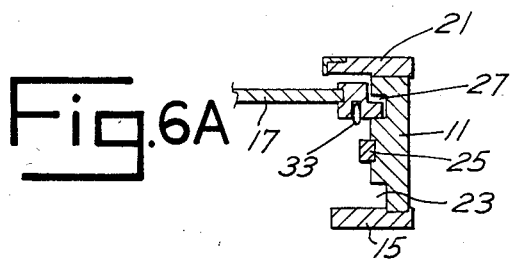
FIG. 6A is a front cross-sectional view of the lower assembly in the cleaning position.

Referring now to FIGS. 6 and 6A, the lower assembly is also characterized by a cleaning position wherein the first drawer 17 occupies the upper drawer position and the second drawer 19 is removed from the lower assembly 7. The first drawer 17 is supported in the upper drawer position by the upper slots 27. Thus, the first drawer 17 is in position to collect debris, while the second drawer 19 is removed from the lower assembly 7 and may be cleaned.

Referring to FIGS. 3–6A, the lower assembly may be moved from its collection position to its cleaning position by the following sequence. To move from the collection position to the first intermediate position, the first drawer 17 is pulled out of the lower assembly 7. Since the second drawer 19 rested on the first drawer 17 in the collection position, the removal of the first drawer 17 causes the second drawer 19 to descend from the upper drawer position to the lower drawer position as the first drawer 17 is removed. Knob 29 is provided on the front of the first drawer 17 to aid its removal.

The lower assembly 7, now in the first intermediate position, may be easily moved to the second intermediate position by placing the first drawer 17 in the upper drawer position. The lower assembly may then be easily moved from the second intermediate position to the cleaning position by pulling the second drawer 19 out of the lower assembly 7 with the assistance of knob 31. When the second drawer 19 is removed from the lower drawer position, the first drawer 17 does not descend into the lower drawer position. Rather, the first drawer 17 is supported by the upper slots 27 and remains in the upper drawer position advantageously positioned to collect the debris from the upper cage assembly 1 while the second drawer 19 is leisurely cleaned.

Once the second drawer 19 has been cleaned, the lower assembly may be returned to its normal collection position by reversing the steps described above. Specifically, the lower assembly can be moved from its cleaning position to its second intermediate position by reinserting the second drawer 19 into the lower drawer position of the lower assembly 7. The lower assembly may then be moved from the second intermediate position to the first intermediate position by removing the first drawer 17 from the upper drawer position. Thus, the clean second drawer 19 is again in position to collect the debris from the upper cage assembly 1. To return the lower assembly to the normal collection position from the first intermediate position, it is only necessary to insert the first drawer 17 beneath the second drawer 19 such that the second drawer 19 is forced upwards from the lower drawer position into the upper drawer position. If the first drawer 17 became soiled while in the second intermediate position or the cleaning position, the first drawer 17 may be cleaned while the lower assembly 7 is positioned in the first intermediate position. Thus, the bird cage of the present invention can be completely and thoroughly cleaned of debris without the need to capture or remove the confined bird or to lift the bird cage in its entirety.

In a most preferred embodiment of the present invention as shown in FIGS. 3A, 4A, 5A and 6A, both the first drawer 17 and the second drawer 19 are outfitted with lower wheels 33 that facilitate the removal and insertion of the drawers 17 and 19 when the lower assembly 7 is moved between its four characteristic positions. These lower wheels 33 allow the drawers 17 and 19 to roll relative to the bottom 15 of the lower assembly 7 or the top of the other drawer. Also included in the most preferred embodiment are foam seals 35 located on the underside of upper flange 21. These foam seals 35 are positioned to sealably cooperate with the second drawer 19 while the lower assembly 7 is in its normal collection position, as shown in FIG. 3A. To aid in the creation of this seal, the lower wheels 33 of the first drawer 17 and the second drawer 19 may be advantageously spring biased in a downward direction. This bias tends to push the drawer 17 or 19 in the upper drawer position upward into sealing contact with foam seals 35.

Figure 7:
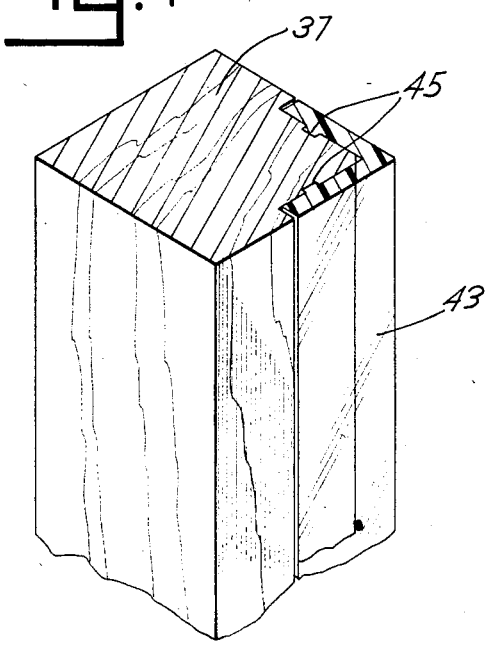
FIG. 7 is a side perspective view of a protectively coated wood corner piece.
Figure 8:
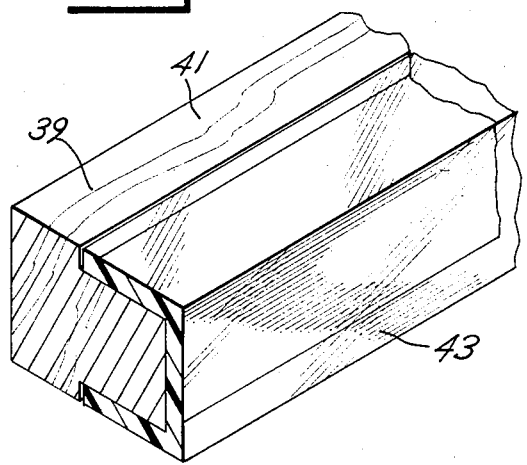
FIG. 8 is a side perspective view of a protectively coated wood horizontal support slat or a vertical bar.

Referring now to FIGS. 7 and 8, which show another embodiment of the present invention, the upper assembly 1 of the bird cage is made of wood. To prevent species of birds, such as parakeets, from chewing the wooden upper cage assembly 1, the corner pieces 37, the horizontal support slats 39, and the vertical bars 41 of the upper cage assembly 1 are protectively coated on their interiors such that the wood portions of the upper cage assembly 1 are not exposed to chewing. However, to preserve the decorative beauty of the wooden upper cage assembly 1, the exterior portions of the corner pieces 37, horizontal support slats 39, and the vertical bars 41, are not protectively coated.

As shown specifically in FIG. 7, the corner pieces 37 may be preferably fitted with vinyl sheaths 43 that are affixed to the interior portions of the corner piece 37. These vinyl sheaths may be affixed by adhesive, by notch means 45 as shown, or by any other suitable affixation means. Referring to FIG. 8, the horizontal support slats 39 and the vertical bars 41 may be similarly fitted with vinyl sheaths 43. The preferred sheath material is clear vinyl, though any substance that will prevent or retard the bird confined within the upper cage assembly 1 from chewing on or through the wooden interior of the upper cage assembly 1 is appropriate. In the case of clear vinyl, the thickness of the vinyl sheaths 43 should be at least 0.07 inches or 70 mils in thickness. The vinyl sheaths 43, of course, may be of greater thickness, most preferably not thicker than 0.1 inch or 100 mils thick. Thus, the bird cage of the present invention can retain the decorative beauty of wood construction while allowing use with species of birds that would otherwise destroy the cage.

It is to be understood that certain embodiments of the present invention have been discussed and emphasized. This is no way limits the present invention to these specific embodiments since many additional embodiments fall within the spirit and scope of the invention as hereafter claimed.

I hereby claim as my invention:

1. A bird cage comprising an upper cage assembly for the confinement of a bird and a lower assembly for the collection of debris, the lower assembly including a plurality of opposed side walls, a first drawer and a second drawer, the opposed side walls defining a lower drawer position and an upper drawer position within the lower assembly, the opposed side walls including support means, the lower assembly being characterized by at least four positions, namely, a collection position, a first intermediate position, a second intermediate position, and a cleaning position;

(a) the collection position comprising the first drawer being positioned in the lower drawer position and the second drawer being positioned in the upper drawer position such that the second drawer is positioned to collect debris and rests on the first drawer;

(b) the first intermediate position comprising the second drawer being positioned in the lower drawer position and the first drawer being removed from the lower assembly;

(c) the second intermediate position comprising the first drawer being positioned in the upper drawer position and the second drawer being positioned in the lower drawer position; and (d) the cleaning position comprising the first drawer being positioned in the upper drawer position and the second drawer being removed from the lower assembly, the first drawer being supported by the support means;

the lower assembly being movable from the collection position to the first intermediate position by the removal of the first drawer from the lower assembly such that the second drawer descends from the upper drawer position to the lower drawer position, the lower assembly being movable from the first intermediate position to the collection position by the insertion of the first drawer beneath the second drawer such that the second drawer is forced up by the first drawer from the lower drawer position to the upper drawer position, the lower assembly being movable between the first intermediate position and the second intermediate position by the insertion or removal of the first drawer, and the lower assembly being movable between the second intermediate position and the cleaning position by the insertion or removal of the second drawer;

whereby cleaning of debris from the lower assembly may be accomplished by moving the lower assembly from the collection position to the first intermediate position to the second intermediate position to the cleaning position such that the second drawer may be cleaned while the first drawer is positioned to collect debris, and whereby the cleaned lower assembly may be returned to its collection position by moving the lower assembly from the cleaning position to the second intermediate position to the first intermediate position to the collection position.

2. The bird cage according to claim 1 wherein the support means comprise slots in the opposed side walls that are engageable with the first drawer when the first drawer is positioned in the upper drawer position.

3. The bird cage according to claim 1 wherein the lower assembly additionally comprises a bottom that is attached to the opposite side walls.

4. The bird cage according to claim 3 wherein the first drawer in the collection position rests on the bottom.

5. The bird cage according to claim 3 wherein the second drawer in the first intermediate position rests on the bottom.

6. The bird cage according to claim 3 wherein the second drawer in the second intermediate position rests on the bottom.

7. The bird cage according to claim 3 wherein the first drawer additionally comprises a plurality of wheels that allow the first drawer to roll relative to the bottom when the lower assembly is moved between the collection position and the first intermediate position.

8. The bird cage according to claim 3 wherein the second drawer additionally comprises a plurality of wheels that allow the second drawer to roll relative to the bottom when the lower assembly is moved between the second intermediate position and the cleaning position.

9. The bird cage according to claim 2 wherein the opposite side walls additionally comprise rails that are positioned below the support means, the rails being engageable with the second drawer in the first intermediate position such that the second drawer is supported by the rails.

10. The bird cage of claim 2 wherein the opposed side walls additionally comprise rails that are positioned below the support means, the rails being engageable with the second drawer in the second intermediate position such that the second drawer is supported by the rails.

11. The bird cage according to claim 1 wherein the first drawer and the second drawer are slidably cooperative with the lower assembly such that removal or insertion of the first and second drawers may be accomplished by sliding the drawers between the opposed side walls.

12. The bird cage according to claim 1 wherein the first drawer additionally comprises a plurality of wheels that allow the first drawer to roll relative to the second drawer when the lower assembly is moved between the first intermediate position and the second intermediate position or when the lower assembly is moved between the second intermediate position and the cleaning position.

13. The bird cage according to claim 1 wherein the second drawer additionally comprises a plurality of wheels that allow the second drawer to roll relative to the first drawer when the lower assembly is moved between the collection position and the first intermediate position.

* * * * *